(12) United States Patent
Wiener

(10) Patent No.: US 10,127,390 B2
(45) Date of Patent: Nov. 13, 2018

(54) TAMPER RESISTANT CRYPTOGRAPHIC ALGORITHM IMPLEMENTATION

(71) Applicant: Irdeto B.V., Hoofddorp (NL)

(72) Inventor: Michael Wiener, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 361 days.

(21) Appl. No.: 14/779,264

(22) PCT Filed: Mar. 27, 2013

(86) PCT No.: PCT/EP2013/056615
§ 371 (c)(1),
(2) Date: Sep. 22, 2015

(87) PCT Pub. No.: WO2014/154270
PCT Pub. Date: Oct. 2, 2014

(65) Prior Publication Data
US 2016/0048689 A1 Feb. 18, 2016

(51) Int. Cl.
*G06F 21/60* (2013.01)
*H04L 9/00* (2006.01)
(Continued)

(52) U.S. Cl.
CPC ............ *G06F 21/602* (2013.01); *G06F 9/466* (2013.01); *H04L 9/004* (2013.01); *H04L 9/0631* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 2007/0019805 A1* | 1/2007 | Karpovsky | ............. | H04L 9/004 380/28 |
| 2007/0189536 A1* | 8/2007 | Gammel | ................. | H04L 9/004 380/259 |
| 2015/0249679 A1* | 9/2015 | Villegas | .................. | H04L 9/003 713/159 |

FOREIGN PATENT DOCUMENTS

| | | |
|---|---|---|
| CN | 1601578 A | 3/2005 |
| CN | 1815528 A | 8/2006 |

(Continued)

OTHER PUBLICATIONS

Chow et al., "White-Box Cryptography and an AES Implementation", Cloakware Corporation, Aug. 2002.*
(Continued)

*Primary Examiner* — Henry Tsang
(74) *Attorney, Agent, or Firm* — Rimon, P.C.; Marc S. Kaufman

(57) ABSTRACT

There is provided a method of performing a cryptographic algorithm in software, the cryptographic algorithm comprising one or more processing steps, wherein each processing step is arranged to process a respective input to the processing step so as to generate an output corresponding to the input, characterized in that, for each of at least one of the one or more processing steps, the method comprises: providing a respective input for the processing step as an input to a plurality of implementations of the processing step, wherein each implementation is arranged to output a corresponding intermediate result represented using a respective predetermined output representation; and using the representation of the intermediate results to generate a result for the processing step that is based on each of the intermediate results, wherein, if each intermediate result is the output that corresponds to the input for the processing step then the result for the processing step is the output that corresponds to the (Continued)

input for the processing step. Additionally provided is a method of enabling a data processor to perform a cryptographic algorithm in software, the method comprising: generating an implementation of the cryptographic algorithm, the implementation being arranged such that execution of the implementation by a processor causes the processor to carry out a method according to any one of the preceding claims; and configuring the data processor to execute the implementation of the cryptographic algorithm. There is further provided a system and computer program for carrying out such methods, as well as a computer readable medium for storing such a computer program.

20 Claims, 8 Drawing Sheets

(51) Int. Cl.
*H04L 9/06* (2006.01)
*G06F 9/46* (2006.01)

(56) References Cited

FOREIGN PATENT DOCUMENTS

| | | |
|---|---|---|
| CN | 101401348 A | 4/2009 |
| CN | 101553856 A | 10/2009 |

OTHER PUBLICATIONS

International Search Report and Written Opinion cited in corresponding International Application No. PCT/EP2013/056615 dated Jan. 22, 2014.
Bar-El H et al: "The Sorcerer's Apprentice Guide to Fault Attacks" Proceedings of the IEEE, IEEE. New York, US, vol. 94, No. 2, Feb. 1, 2006, pp. 370-382.
Unknown et al: "Countermeasures against fault attacks on software implemented AES", Proceedings of the 5th Workshop on Embedded Systems Security, WESS '10, Jan. 1, 2010, pp. 1-10.
Karpovsky M et al: "Robust protection against fault-injection attacks on smart cards implementing the advanced encryption standard", Dependable Systems and Networks, 2004 International Conference on Florence, Italy Jun. 28, 2004-Jul. 1, 2004, Piscataway, NJ.
Marc Joyce, "On White-Box Cryptography", Security of Information and Networks, Jan. 1, 2008, pp. 7-12.
Federal Information Processing Standards Publication 197, Advanced Encryption Standard (AES), Nov. 26, 2011.
S. Chow et al., "White-Box Cryptography and an AES Implementation", Cloakware Corporation, Ottawa, Canada.
Chinese Office Action (English Translation) for Chinese Application No. 201380076942.1 dated Feb. 5, 2018, 11 pages.

* cited by examiner

TAMPER RESISTANT CRYPTOGRAPHIC ALGORITHM IMPLEMENTATION

The present application is the United States national stage of International Application No. PCT/EP2013/056615, filed Mar. 27, 2013, the entire content of which is incorporated herein by reference.

FIELD OF THE INVENTION

The present invention relates to a method of performing a cryptographic algorithm in software, a method of enabling a data processor to perform a cryptographic algorithm in software, and apparatus and computer programs for carrying out such methods.

BACKGROUND OF THE INVENTION

Cryptographic algorithms for processing digital data are well-known. Such algorithms may include encryption and decryption algorithms, algorithms to digitally sign data, algorithms to generate message authentication codes, algorithms to authenticate or verify the origin or integrity of data, etc.

An example of a cryptographic algorithm that might be used to encrypt/decrypt digital data is the Advanced Encryption Standard (AES), which is a well-known encryption algorithm, described in Federal Information Processing Standards Publication 197 (found at http://csrc.nist.gov/publications/fips/fips197/fips-197.pdf), the entire disclosure of which is incorporated herein by reference. AES is a symmetric block cipher, where the size of an input block is 128 bits and the size of the corresponding output block is also 128 bits. There are three different variations of AES, known as AES-128, AES-192 and AES-256: for AES-n, the size of the cryptographic key is n bits.

The AES algorithm maintains a "state", which is a 4×4 matrix S, each element of the matrix S being a byte. Let the element at row r and column c of the state S be represented by $S[r,c]$ ($0 \le r < 4$ and $0 \le c < 4$). An input block of data that is to be processed comprises 16 bytes, $in[j]$ ($0 \le j < 16$). The state S is initialized by setting $S[r,c]=in[r+4c]$ ($0 \le r < 4$ and $0 \le c < 4$). The result of processing the input block of data is an output block of data that also comprises 16 bytes, $out[j]$ ($0 \le j < 16$). At the end of the processing, the output block of data is formed from the state S by setting the output block of data according to $out[r+4c]=S[r,c]$ ($0 \le r < 4$ and $0 \le c < 4$). Each processing step or operation of the AES algorithm operates on the current state S, with the state S being modified at each step so as to move it from representing the input block of data to the output block of data. In the following, for each step or function/operation carried out when performing the AES algorithm, the result on the element $S[r,c]$ of the state S of performing that step or applying that function/operation shall be represented by $S'[r,c]$ ($0 \le r < 4$ and $0 \le c < 4$).

The AES algorithm involves a number, Nr, of "rounds". For AES-128, Nr=10; for AES-192, Nr=12; for AES-256, Nr=14. The rounds shall be described shortly.

A key expansion routine is used to generate a key schedule from an initial cryptographic key K. The key schedule comprises Nr+1 so-called "round keys" $RK_j$ ($0 \le j \le Nr$), each round key being 128 bits. The details of the key expansion routine are not important for this disclosure and they shall, therefore, not be described in more detail herein. For more detail on this, see section 5.2 of Federal Information Processing Standards Publication 197.

In AES, bytes are viewed as elements of the field $GF(2^8)$, where multiplication in $GF(2^8)$ is modulo the irreducible polynomial $x^8+x^4+x^3+x+1$.

FIG. 1 of the accompanying drawings provides an overview of encryption 100 using the AES algorithm.

The state S is initialized using an input block of data 110—data $in[j]$ ($0 \le j < 16$)—as described above.

Next, the state S is processed by an "AddRoundKey" function 120, using the round key $RK_0$.

Next, rounds 1, 2, ..., Nr−1 are performed, one after the other. For round R ($1 \le R < Nr$), the $R^{th}$ round involves:
  (a) processing the state S using a "SubBytes" function 130, followed by
  (b) processing the state S using a "ShiftRows" function 140, followed by
  (c) processing the state S using a "MixColumns" function 150, followed by
  (d) processing the state S using the AddRoundKey function 120, using the round key $RK_R$.

Finally, the $Nr^{th}$ round is performed, which involves:
  (a) processing the state S using the SubBytes function 130, followed by
  (b) processing the state S using the ShiftRows function 140, followed by
  (c) processing the state S using the AddRoundKey function 120, using the round key $RK_{Nr}$.

Thus, the $Nr^{th}$ round is the same as the previous Nr−1 rounds, except that it does not include the MixColumns function 150.

An output block of data 160—data $out[j]$ ($0 \le j < 16$)—can then be formed from the state S as described above.

The AddRoundKey function 120 involves XOR-ing the bytes of the current round key $RK_R$ being used ($0 \le R \le Nr$) with the bytes of the state S. In particular, if the round key $RK_R$ is a series of bytes $k[j]$ ($0 \le j < 16$), then element $S[r,c]$ of the state S is XOR-ed with byte $k[r+4c]$ ($0 \le r < 4$ and $0 \le c < 4$), so that the element $S[r,c]$ of the state S becomes $S'[r,c]=S[r,c] \oplus k[r+4c]$.

The SubBytes function 130 operates on each of the 16 bytes of the state S separately as follows. The element $S[r,c]$ ($0 \le r < 4$ and $0 \le c < 4$) is viewed as an element of $GF(2)$ and its multiplicative inverse in $GF(2^8)$ is determined. If we represent this inverse as a byte b that has bits $b_7, b_6, \ldots, b_1, b_0$ (running from most to least significant bit), and if the result of applying the SubBytes function to the element $S[r,c]$ (i.e. the byte $S'[r,c]$) is a byte that has bits $c_7, c_6, \ldots, c_1, c_0$ (running from most to least significant bit), then $S'[r,c]$ may be calculated as:

$$\begin{bmatrix} c_0 \\ c_1 \\ c_2 \\ c_3 \\ c_4 \\ c_5 \\ c_6 \\ c_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}$$

The SubBytes function 130 is often implemented simply by a lookup table. In particular, for $0 \le r < 4$ and $0 \le c < 4$, if $S[r,c]=16u+v$ for integer values $0 \le u,v < 16$, then the application of the SubBytes function 130 to $S[r,c]$ changes the value $S[r,c]$ to the value $S'[r,c]$ given at row u and column v of Table 1 below. The values in Table 1 are in hexadecimal.

TABLE 1

|   | v |   |   |   |   |   |   |   |   |   |    |    |    |    |    |    |
|---|---|---|---|---|---|---|---|---|---|---|----|----|----|----|----|----|
|   |   | 0 | 1 | 2 | 3 | 4 | 5 | 6 | 7 | 8 | 9 | 10 | 11 | 12 | 13 | 14 | 15 |
| u | 0 | 63 | 7c | 77 | 7b | f2 | 6b | 6f | c5 | 30 | 01 | 67 | 2b | fe | d7 | ab | 76 |
|   | 1 | ca | 82 | c9 | 7d | fa | 59 | 47 | f0 | ad | d4 | a2 | af | 9c | a4 | 72 | c0 |
|   | 2 | b7 | fd | 93 | 26 | 36 | 3f | f7 | cc | 34 | a5 | e5 | f1 | 71 | d8 | 31 | 15 |
|   | 3 | 04 | c7 | 23 | c3 | 18 | 96 | 05 | 9a | 07 | 12 | 80 | e2 | eb | 27 | b2 | 75 |
|   | 4 | 09 | 83 | 2c | 1a | 1b | 6e | 5a | a0 | 52 | 3b | d6 | b3 | 29 | e3 | 2f | 84 |
|   | 5 | 53 | d1 | 00 | ed | 20 | fc | b1 | 5b | 6a | cb | be | 39 | 4a | 4c | 58 | cf |
|   | 6 | d0 | ef | aa | fb | 43 | 4d | 33 | 85 | 45 | f9 | 02 | 7f | 50 | 3c | 9f | a8 |
|   | 7 | 51 | a3 | 40 | 8f | 92 | 9d | 38 | f5 | bc | b6 | da | 21 | 10 | ff | f3 | d2 |
|   | 8 | cd | 0c | 13 | ec | 5f | 97 | 44 | 17 | c4 | a7 | 7e | 3d | 64 | 5d | 19 | 73 |
|   | 9 | 60 | 81 | 4f | dc | 22 | 2a | 90 | 88 | 46 | ee | b8 | 14 | de | 5e | 0b | db |
|   | 10 | e0 | 32 | 3a | 0a | 49 | 06 | 24 | 5c | c2 | d3 | ac | 62 | 91 | 95 | e4 | 79 |
|   | 11 | e7 | c8 | 37 | 6d | 8d | d5 | 4e | a9 | 6c | 56 | f4 | ea | 65 | 7a | ae | 08 |
|   | 12 | ba | 78 | 25 | 2e | 1c | a6 | b4 | c6 | e8 | dd | 74 | 1f | 4b | bd | 8b | 8a |
|   | 13 | 70 | 3e | b5 | 66 | 48 | 03 | f6 | 0e | 61 | 35 | 57 | b9 | 86 | c1 | 1d | 9e |
|   | 14 | e1 | f8 | 98 | 11 | 69 | d9 | 8e | 94 | 9b | 1e | 87 | e9 | ce | 55 | 28 | df |
|   | 15 | 8c | a1 | 89 | 0d | bf | e6 | 42 | 68 | 41 | 99 | 2d | 0f | b0 | 54 | bb | 16 |

Other ways of representing the SubBytes function 130 are possible.

The ShiftRows function 140 cyclically shifts the bytes of the last three rows of the state S. In particular, for row r of the state S ($1 \leq r < 4$), the elements of row r are cyclically shifted by r positions to the left, i.e. the application of the ShiftRows function 140 to S[r,c] sets the value S[r,c] to the value S'[r,c] given by S'[r,c]=S[r,(c+r)(mod4)] (for $0 \leq r < 4$ and $0 \leq c < 4$).

With the MixColumns function 150, each column of the state S is processed by multiplying that column by a particular matrix. In particular, for $0 \leq c < 4$, the MixColumns function 150 operates on the $c^{th}$ column according to:

$$\begin{pmatrix} S'[0,c] \\ S'[1,c] \\ S'[2,c] \\ S'[3,c] \end{pmatrix} = \begin{pmatrix} 2 & 3 & 1 & 1 \\ 1 & 2 & 3 & 1 \\ 1 & 1 & 2 & 3 \\ 3 & 1 & 1 & 2 \end{pmatrix} \begin{pmatrix} S[0,c] \\ S[1,c] \\ S[2,c] \\ S[3,c] \end{pmatrix}$$

where: multiplication by 1 means no change; multiplication by 2 means shifting to the left; and multiplication by 3 means shifting to the left and then XOR-ing the with the initial un-shifted value. Here, "shift" means a shift of the binary representation of the respective value to the left, as is known in the art (so that, for example, the binary value 10110011 becomes 101100110). After a shifting, the shifted value should be XOR-ed with 0x11B if the shifted value is larger than 0xFF.

Other ways of representing the MixColumns function 150 are possible. For example, the elements of the $c^{th}$ column of the state S may be treated as coefficients of a four-term polynomial over $GF(2^8)$, with this polynomial then being multiplied modulo $x^4+1$ by the polynomial $3x^3+x^2+x+2$—the coefficients of the resultant polynomial then form the updated elements of the $c^{th}$ column of the state S.

FIG. 2 of the accompanying drawings provides an overview of decryption 200 using the AES algorithm.

Each of the AddRoundKey function 120, the SubBytes function 130, the ShiftRows function 140, and the MixColumns function 150 is invertible, as set out below.

The inverse of the AddRoundKey function 120, called InvAddRoundKey 220, is exactly the same as the AddRoundKey function 120.

The inverse of the SubBytes function 130, called InvSubBytes 230, can be implemented using the inverse of the transformation set out above in the description of the SubBytes function 130, or using a lookup table given by Table 2 below. The values in Table 2 are in hexadecimal. In particular, for $0 \leq r < 4$ and $0 \leq c < 4$, if S[r,c]=16u+v for integer values $0 \leq u,v < 16$, then the application of the InvSubBytes function 230 to S[r,c] changes the value S[r,c] to the value S'[r,c] given in Table 2 below at row u and column v.

TABLE 2

|   | v |   |   |   |   |   |   |   |   |   |    |    |    |    |    |    |
|---|---|---|---|---|---|---|---|---|---|---|----|----|----|----|----|----|
|   |   | 0 | 1 | 2 | 3 | 4 | 5 | 6 | 7 | 8 | 9 | 10 | 11 | 12 | 13 | 14 | 15 |
| u | 0 | 52 | 09 | 6a | d5 | 30 | 36 | a5 | 38 | bf | 40 | a3 | 9e | 81 | f3 | d7 | fb |
|   | 1 | 7c | e3 | 39 | 82 | 9b | 2f | ff | 87 | 34 | 8e | 43 | 44 | c4 | de | e9 | cb |
|   | 2 | 54 | 7b | 94 | 32 | a6 | c2 | 23 | 3d | ee | 4c | 95 | 0b | 42 | fa | c3 | 4e |
|   | 3 | 08 | 2e | a1 | 66 | 28 | d9 | 24 | b2 | 76 | 5b | a2 | 49 | 6d | 8b | d1 | 25 |
|   | 4 | 72 | f8 | f6 | 64 | 86 | 68 | 98 | 16 | d4 | a4 | 5c | cc | 5d | 65 | b6 | 92 |
|   | 5 | 6c | 70 | 48 | 50 | fd | ed | b9 | da | 5e | 15 | 46 | 57 | a7 | 8d | 9d | 84 |
|   | 6 | 90 | d8 | ab | 00 | 8c | bc | d3 | 0a | f7 | e4 | 58 | 05 | b8 | b3 | 45 | 06 |
|   | 7 | d0 | 2c | 1e | 8f | ca | 3f | 0f | 02 | c1 | af | bd | 03 | 01 | 13 | 8a | 6b |
|   | 8 | 3a | 91 | 11 | 41 | 4f | 67 | dc | ea | 97 | f2 | cf | ce | f0 | b4 | e6 | 73 |
|   | 9 | 96 | ac | 74 | 22 | e7 | ad | 35 | 85 | e2 | f9 | 37 | e8 | 1c | 75 | df | 6e |
|   | 10 | 47 | f1 | 1a | 71 | 1d | 29 | c5 | 89 | 6f | b7 | 62 | 0e | aa | 18 | be | 1b |
|   | 11 | fc | 56 | 3e | 4b | c6 | d2 | 79 | 20 | 9a | db | c0 | fe | 78 | cd | 5a | f4 |
|   | 12 | 1f | dd | a8 | 33 | 88 | 07 | c7 | 31 | b1 | 12 | 10 | 59 | 27 | 80 | ec | 5f |
|   | 13 | 60 | 51 | 7f | a9 | 19 | b5 | 4a | 0d | 2d | e5 | 7a | 9f | 93 | c9 | 9c | ef |

TABLE 2-continued

| | v | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 14 | a0 | e0 | 3b | 4d | ae | 2a | f5 | b0 | c8 | eb | bb | 3c | 83 | 53 | 99 | 61 |
| 15 | 17 | 2b | 04 | 7e | ba | 77 | d6 | 26 | e1 | 69 | 14 | 63 | 55 | 21 | 0c | 7d |

The inverse of the ShiftRows function 140, called InvShiftRows 240, cyclically shifts the bytes of the last three rows of the state S. In particular, for row r of the state S ($1 \leq r < 4$), the elements of row r are cyclically shifted by r positions to the right, i.e. the application of the InvShiftRows function 240 to S[r,c] sets the value S[r,c] to the value S'[r,c] given by $S'[r,c]=S[r,(c-r)(\mod 4)]$ (for $0 \leq r < 4$ and $0 \leq c < 4$). Note that, for $0 \leq r < 4$, this is equivalent to cyclically shifting the elements of the $r^{th}$ row $(4-r) \mod 4$ positions to the left.

For the inverse of the MixColumns function 150, called InvMixColumns 250, each column of the state S is processed by multiplying the column by a particular matrix. In particular, for ($0 \leq c < 4$), the MixColumns function 150 operates on the $c^{th}$ column according to:

$$\begin{pmatrix} S'[0,c] \\ S'[1,c] \\ S'[2,c] \\ S'[3,c] \end{pmatrix} = \begin{pmatrix} e & b & d & 9 \\ 9 & e & b & d \\ d & 9 & e & b \\ b & d & 9 & e \end{pmatrix} \begin{pmatrix} S[0,c] \\ S[1,c] \\ S[2,c] \\ S[3,c] \end{pmatrix}$$

where: multiplication by e means shifting to the left, XOR-ing with the initial un-shifted value, shifting to the left again, XOR-ing with the initial un-shifted value, and shifting to the left again; multiplication by b means shifting to the left, shifting to the left again, XOR-ing with the initial un-shifted value, shifting to the left again, and XOR-ing with the initial un-shifted value; multiplication by d means shifting to the left, XOR-ing with the initial un-shifted value, shifting to the left again, shifting to the left again, and XOR-ing with the initial un-shifted value; and multiplication by 9 means shifting to the left, shifting to the left again, shifting to the left again, and XOR-ing with the initial un-shifted value. After a shifting, the shifted value should be XOR-ed with 0x11B if the shifted value is larger than 0xFF.

Again, a polynomial representation may be used to implement the InvMixColumns 250 function. In particular, the elements of the $c^{th}$ column of the state S may be treated as coefficients of a four-term polynomial over $GF(2^8)$, with this polynomial then being multiplied modulo $x^4+1$ by the polynomial $(b)x^3+(d)x^2+(9)x+(e)$, where the coefficients of this polynomial are in hexadecimal—the coefficients of the resultant polynomial then form the updated elements of the $c^{th}$ column of the state S.

Thus, decryption of a block of data can be performed by applying the InvAddRoundKey function 220, the InvSubBytes function 230, the InvShiftRows function 240, and the InvMixColumns function 250 in the reserve of the order, set out in FIG. 1, of their counterpart functions, using the same key schedule as for encryption. However, as set out in section 5.3.5 of Federal Information Processing Standards Publication 197, and as shown in the FIG. 2, it is possible to perform decryption 200 of a block of data 210 to form an output block of data 260 using the same order of the functions set out in FIG. 1 (but with the functions in FIG. 1 replaced in FIG. 2 by their inverses), but with the key schedule modified to produce a corresponding decryption key schedule for the purposes of decryption (the round keys for the decryption 200 being denoted $RK'_R$ in FIG. 2).

The skilled person will appreciate that any further details for the AES algorithm can be found in Federal Information Processing Standards Publication 197 and that the above description is provided to assist the reader (who is assumed to be knowledgeable about the AES algorithm).

Although the AES algorithm has been described here in detail by way of example, the skilled person will appreciate that there are numerous other cryptographic algorithms that might be used to process digital data. The skilled person will be assumed to be knowledgeable about the working, operation and implementation of such other cryptographic algorithms.

It is known that various functions, such as each round (or part of a round) in AES, can be implemented using mapping tables or look-up tables instead of an explicit calculation. The lookup table for a function will generally contain all possible output values for the function indexed against (or associated with) the input value(s) for the function that provide each output value. The look-up table is commonly accompanied with some code which will accept input value(s) and provide an output value based on the contents of the look-up table. The code will use the input value(s) it receives to retrieve (or 'lookup') from the table an output value that corresponds to the input value(s) by using the indexing or association between the input values and the output values that is present in the table.

When a program (or software) is being executed by a processor, the environment in which the execution is being performed is a so-called "white-box" environment if the user (or a third party) has access to the processing so that the user can observe and alter the execution of the program (e.g. by running a suitable debugger)—such alterations could be changes to the process flow or changes to the data being processed. This observation and/or alteration of the execution of the program may be referred to as tampering. The user may observe or alter (or in other words tamper with) the execution of a program in order to satisfy their own aims or goals, which may not be possible to satisfy if the program were to run normally without being tampered with. Such tampering to achieve a particular aim or goal may be referred to as goal-directed tampering. Goal-directed tampering may involve, for example, observing and/or altering the execution of a program being run in a white-box environment in order to obtain or deduce a cryptographic key that is used by the program to process digital data (e.g. a decryption key for decrypting data).

Various techniques are known for protecting the integrity of a data processing software application (or program or system) which is being run in a white-box environment. These techniques generally aim to hide the embedded knowledge of the application by introducing additional complexity and/or randomness in the control and/or data paths of the software application. This additional complexity and/or randomness has the effect of obscuring or obfuscating the information (or data) or execution path of the software application. As a result of this obfuscation, it becomes more difficult to extract information from the application by code inspection and it is more difficult to find and/or modify the code that is associated with particular functionality of the program. It is therefore much more difficult for an attacker with access to the program running in a white-box environment to retrieve sensitive data or alter the operation of the program in order to meet their own goals by tampering with the execution of the program. As such, the ability of the attacker to carry out goal-directed tampering is reduced. These techniques which aim to reduce the ability of an attacker to carry out goal-directed tampering may be considered to improve the tamper-resistance of the software. If it is sufficiently difficult for an attacker to carry out goal-directed tampering, then, for any practical purposes, the software may be considered to be tamper-resistant, even if theoretically tampering is still possible.

An exemplary technique for improving the tamper-resistance of software can be found in "*White-Box Cryptography and an AES Implementation*", by Stanley Chow, Philip Eisen, Harold Johnson, and Paul C. Van Oorschot, in Selected Areas in Cryptography: $9^{th}$ Annual International Workshop, SAC 2002, St. John's, Newfoundland, Canada, Aug. 15-16, 2002, the entire disclosure of which is incorporated herein by reference. "*White-Box Cryptography and an AES Implementation*" discloses an approach to protecting the integrity of a so cryptographic algorithm by creating a key-dependent implementation of the algorithm using a series of lookup tables. The key(s) are embedded in the implementation by partial evaluation of the algorithm with respect to the key(s). Partial evaluation means that expressions involving the key are evaluated as much as reasonably possible, and the result is put in the code rather than the full expressions. This means that the implementation is specific to particular key(s) and that key input is unnecessary in order to use the key-dependent implementation of the algorithm. It is therefore possible to distribute a key-dependent implementation of an algorithm, which may be user-specific, for encrypting or decrypting content or data instead of distributing keys, which may be user-specific. The key-dependent implementation is created so as to hide the key(s) by: (1) using tables for compositions rather than individual steps; (2) encoding these tables with random bijections; and (3) extending the cryptographic boundary beyond the cryptographic algorithm itself further out into the containing application, thereby forcing attackers to understand significantly larger code segments to achieve their goals.

FIG. 3 of the accompanying drawings illustrates an implementation 310 of an exemplary function X which receives or obtains data d at, or via, an input 312 to the function X, processes the data d to generate processed data X(d), and provides the processed data X(d) via an output 316. The implementation 310 of the function might involve one or more processing steps which comprise one or more of instructions, code, logic, lookup tables or any combination thereof in order to provide the processed data X(d) at the output 316 in response to receiving data d at the input 312. FIG. 3 further illustrates an encoded or obfuscated implementation 320 of the function X—this implementation 320 comprises an obfuscated function X'. In the implementation 320, the function X is obfuscated to form the function X' by using an input encoding F and an output encoding G. The obfuscated function X' receives or obtains an encoded representation F(d) of the input data d at, or via, an input 322 to the obfuscated function X', processes the encoded representation F(d) to generate an encoded to representation G(X(d)) of the processed data X(d), and provides the encoded representation G(X(d)) via an output 328. The encoded representation F(d) is the data d encoded using the function F. The encoded representation G(X(d)) is the data X(d) encoded using the function G. The obfuscated function X' can be considered as:

$$X'=G \circ X \circ F^{-1}$$

where $\circ$ denotes function composition as usual (i.e. for any two functions a(x) and b(x), (a$\circ$b)(x)=a(b(x)) by definition). The functions $F^{-1}$, X, G are obfuscated in the implementation by combining them into a single lookup table. This combination of the functions into a single lookup table means that as long as the functions F and G remain unknown to an attacker, the attacker cannot extract information about the function X and hence cannot, for example, extract secret information (such as a cryptographic key) that is the basis for, or that is used by, the function X. Whilst the middle of FIG. 3 illustrates the obfuscated function X' as the series of functions $F^{-1}$, X and G, this is merely for the purpose of illustration. In particular, the obfuscated function X' does not implement each of the functions $F^{-1}$, X and G separately (as to do so would expose the data d and X(d) and the operation of the function X to an attacker)—instead, as mentioned above, the functions $F^{-1}$, X and G are implemented together as a single function (such as via a look-up table), so that the obfuscated function X' does not expose the data d and X(d) to an attacker and does not expose the processing or operation of the function X to an attacker.

Any given program can be thought of as a sequence or network of functions. FIG. 4 of the accompanying drawings illustrates an exemplary implementation 410 of a program or part of a program whereby two functions X and Y are to be evaluated sequentially (i.e. as part of a sequence) in order to provide the operation:

$$(Y \circ X)(d)=Y(X(d))$$

In other words, the sequence of functions receives or obtains data d at, or via, an input 312 to the first function in the sequence, namely the function X, the function X then processes the data d to generate processed data X(d) and provides the processed data X(d) via an output 316, as discussed above. The processed data X(d) is provided via the output 316 of the first function X to an input 412 of the second function in the sequence of functions, namely the function Y, the function Y then processes the data X(d) to generate processed data Y(X(d)) and provides the processed data Y(X(d)) via an output 416. In this manner, the processed data Y(X(d)) provided at the output 416 of the second function Y is provided as the output from the sequence of functions X and Y. Again, each of the functions X and Y can respectively be implemented as one or more of instructions, code, logic or lookup tables or any combination thereof, as discussed above. However, when the implementation 410 of the sequence of functions X and Y is executed in a white-box environment, an attacker can observe and/or modify one or more of: the operation of each of the functions X and Y; the data d provided to the input 312 of the sequence of functions; the processed data Y(X(d)) provided at the output 416 of the sequence of functions; and the processed data X(d), which is provided to the input 412 of the second function Y from the output 316 of the first function X. Therefore, when the sequence of functions X and Y is executed as the implementation 410 in a white-box environment, the operation provided by that sequence of functions is susceptible to tampering. Where the implementation 410 of the sequence of functions X and Y form a key-dependent implementation of a cryptographic component for a program, for example, it may be possible for an attacker to extract or deduce a cryptographic key by observing or tampering with the functions X and/or Y and/or the data that is provided to/between them. To overcome this problem, the functions X and Y in the sequence of functions X and Y can be implemented as obfuscated versions X' and Y' of those functions X and Y respectively.

FIG. 4 further illustrates such an encoded or obfuscated implementation 420 of the sequence of functions X and Y—the implementation 420 comprises an obfuscated function X' and an obfuscated function Y'. In the implementation 420, the obfuscated function X' of the function X is formed by combining the function X with an input encoding F and an output encoding G, as described earlier in relation to FIG. 3. The obfuscated function Y' of the function Y is formed in a similar manner to the obfuscated function X', albeit that the input encoding G and output encoding H that are used for the implementation of obfuscated function Y' may differ from the input encoding F and the output encoding G that are used for the implementation of obfuscated function X'. The obfuscated implementation Y' of function Y can therefore be represented as:

$$Y'=H \circ Y \circ G^{-1}$$

The input encoding G used with obfuscated function Y' should match the output encoding G used with the obfuscated implementation of the preceding function X'. This means that the representation of the processed data G(X(d)) provided at the output 328 of the obfuscated function X' using the output encoding G can be used as the input to the obfuscated function Y' which expects to receive the data X(d) represented using input encoding G (i.e. it expects to receive G(X(d))). It will be appreciated that whilst the function G is referred to as being the input encoding for the obfuscated function Y' (since the data X(d) that is to be received at the input 328 to the obfuscated function Y' is encoded with the function G such that it is the encoded representation G(X(d)) of the data X(d)), the actual function that is combined with the function Y to implement the obfuscated function Y' is the inverse of the function G, namely the function $G^{-1}$, which has the effect of cancelling out the input encoding G to allow the operation of the function Y on the data X(d).

The obfuscated function Y' receives the data X(d) represented as G(X(d)) (i.e. encoded by the function G) from the output 328 of obfuscated function X'. The obfuscated function Y' processes the encoded representation G(X(d)) of the processed data X(d) to generate an encoded representation H(Y(X(d))) of the processed data Y(X(d)), and provides the encoded representation H(Y(X(d))) via output 428. Since the obfuscated function Y' is the last function in the sequence of functions, the output 428 of the obfuscated function Y' is the output of the obfuscated implementation 420 of the sequence of functions.

Again, whilst the middle of FIG. 4 illustrates the obfuscated function Y' as the series of functions $G^{-1}$, Y and H, this is merely for the purpose of illustration. In particular, the obfuscated function Y' does not implement each of the functions $G^{-1}$, Y and H separately (as to do so would expose the data X(d) and Y(X(d)) and the operation of the function Y to an attacker)—instead, as mentioned above, the functions $G^{-1}$, Y and H are implemented together as a single function (such as via a look-up table), so that the obfuscated function Y' does not expose the data X(d) and Y(X(d)) to an attacker and does not expose the processing or operation of the function Y to an attacker.

It will be appreciated that in order for the representation of the output H(Y(X(d))) of the obfuscated implementation 420 of the sequence of functions to be correctly calculated, the input d to the implementation 420 must be represented as F(d) using the input encoding of the first obfuscated function in the sequence of obfuscated functions (i.e. F), whilst the output encoding of each obfuscated function in the sequence (except for the last obfuscated function in the sequence) must match the input encoding of the next function. The output encoding of the last obfuscated function in the sequence (i.e. H) dictates the representation of the output that is provided from the obfuscated sequence of functions (i.e. H(Y(X(d)))).

The obfuscated implementation 420 of the sequence of functions X and Y can therefore be represented as:

$$Y' \circ X'=(H \circ Y \circ G^{-1}) \circ (G \circ X \circ F^{-1})=H \circ (Y \circ X) \circ F^{-1}$$

In this way, $Y \circ X$ is properly computed albeit that the input d needs to be encoded with the function F and the output H(Y(X(d))) needs to be decoded with the function $H^{-1}$. Each obfuscated function X' and Y' can be separately represented in respective lookup tables, such that the functions H, Y and $G^{-1}$ are combined in a table implementing the obfuscated function Y' and the functions G, X and $F^{-1}$ are implemented in a different table implementing the obfuscated function X'. By combining the functions into single lookup tables in this manner, the details of the functions X and Y, the data they operate on and output, as well as functions F, G and H are hidden. Meanwhile, the data X(d) that is passed between the lookup tables in the obfuscated implementation 420 is represented using the encoding G (i.e. as G(X(d))). This means that an attacker cannot observe any useful information in the data flows between the obfuscated functions in the obfuscated implementation 420.

The representation of the output G(X(d)) that is provided from the sequence of obfuscated functions will correspond to the output X(d) of the sequence of non-obfuscated functions encoded by the function G, assuming that the input data d is provided to the obfuscated sequence of functions represented as F(d) (i.e. encoded by the function F) and that no errors occur during processing.

The use of input and output encodings for the obfuscated implementation 420 of the sequence of functions has the effect that the obfuscated functionality is bound more tightly into the rest of the program or system in which implementation 420 operates. This is because the functions in the rest of the program or system which provide data to (or call) the obfuscated sequence of functions, provides a representation of the data encoded using the input encoding F, whilst the functions in the rest of the program or system which receive data from the obfuscated sequence of functions receive a representation of the processed data encoded using the output encoding H. Therefore, the effect of the obfuscation extends the code which an attacker would have to understand beyond the sequence of functions themselves into the surrounding functions or parts of the program. In the case where the obfuscated implementation 420 is a cryptographic component of a program, which will commonly be part of a larger containing system or application, the use of input and output encodings has the effect of extending the cryptographic boundary beyond the cryptographic algorithm itself further out into the containing system or application. This makes it harder to extract a key-specific implementation of the cryptographic algorithm from the rest of the application and forces an attacker to understand larger parts of the code in order to tamper with the software, thereby making the software harder to tamper with.

Although FIGS. 3 and 4 illustrate obfuscated functions which have both input and output encodings applied to them, it will be appreciated that it is possible to obfuscate a function by only combining either an input or an output encoding with the function. As an example, although not illustrated in FIG. 4, the obfuscated function X' could be implemented so that it uses an output encoding G, but not input encoding F. Similarly, the obfuscated function Y' could be implemented so that it uses an input encoding G, but not output encoding H. This arrangement can be represented as:

$$Y'\circ X'=(Y\circ G^{-1})\circ(G\circ X)=Y\circ X$$

As a result, the input to the sequence of obfuscated functions could be the data d, which is the same representation of the input as would be provided to the non-obfuscated sequence of functions, and the output of the sequence of obfuscated functions would be Y(X(d)), which is the same representation of the output that would be provided by the non-obfuscated sequence of functions. However, the sequence of functions is still obfuscated in so far as an attacker is unable to observe the result of function X or the input of function Y. Therefore, provided that the details of the function G are unknown to the attacker, it will still be hard for an attacker to ascertain the details of these functions in order to extract a key.

Whilst FIG. 4 illustrates a sequence of two function X and Y that are then implemented as obfuscated functions X' and Y', it will be appreciated that any number of functions (in a series, network, chain, etc.) could be implemented as a series, network, chain, etc. of corresponding obfuscated functions.

SUMMARY OF THE INVENTION

Attackers are continually developing new methods, or improvements to existing methods, for attacking software, particularly software running in a white-box environment. It is, therefore, desirable, when implementing an algorithm or function in software, to be able to include further techniques in that implementation that make it more difficult for an attacker to successfully attack or tamper with that implementation.

According to a first aspect of the invention, there is provided a method of performing a cryptographic algorithm in software, the cryptographic algorithm comprising one or more processing steps, wherein each processing step is arranged to process a respective input to the processing step so as to generate an output corresponding to the input, characterized in that, for each of at least one of the one or more processing steps, the method comprises: providing a respective input for the processing step as an input to a plurality of implementations of the processing step, wherein each implementation is arranged to output a corresponding intermediate result represented using a respective predetermined output representation; and using the representation of the intermediate results to generate a result for the processing step that is based on each of the intermediate results, wherein, if each intermediate result is the output that corresponds to the input for the processing step then the result for the processing step is the output that corresponds to the input for the processing step.

In some embodiments of the invention, each implementation uses a respective predetermined output representation that is different from the respective predetermined output representation used by the other implementations.

In some embodiments of the invention, for at least one of the implementations, the respective predetermined representation represents the intermediate result as the intermediate result.

In some embodiments of the invention, each predetermined representation is a bijective mapping.

In some embodiments of the invention, the result is generated as a function of the intermediate results such that if all of the intermediate results assume the same value then the result assumes that value.

In some embodiments of the invention, the result is generated as a function of the intermediate results such that if the intermediate results do not all assume the same value then the result assumes a random value or a predetermined value.

In some embodiments of the invention, the result is generated as a function of the intermediate results such that if the intermediate results do not all assume the same value then it is infeasible to determine, from the result, the output that corresponds to the input for the processing step.

In some embodiments of the invention, the result is generated as a function of the intermediate results such that if the intermediate results do not all assume the same value then the result is an average of the intermediate results.

In some embodiments of the invention the average of the intermediate results is a mode of the intermediate results.

In some embodiments of the invention, using the representation of the intermediate results to generate a result for the processing step that is based on each of the intermediate results comprises: determining whether all of the intermediate results assume the same value and; if it is determined that the intermediate results do not all assume the same value, performing a predetermined action.

In some embodiments of the invention, the predetermined action comprises one or more of: (a) ceasing performing the cryptographic algorithm; (b) recording that the intermediate results do not all assume the same value.

In some embodiments of the invention, the input for the processing step is provided as an input to the plurality of implementations of the processing step encoded using a predetermined encoding.

In some embodiments of the invention, generating the result comprises generating the result encoded using a predetermined encoding.

In some embodiments of the invention, the at least one of the one or more processing steps is an operation comprising a plurality of processing steps for that operation.

In some embodiments of the invention, the at least one of the one or more processing steps comprises one or more rounds for the cryptographic algorithm.

In some embodiments of the invention, the cryptographic algorithm is either encryption or decryption according to AES or triple DES.

In some embodiments of the invention, the at least one of the one or more processing steps together form a final processing operation for cryptographic algorithm.

In a second aspect of the invention, there is provided a method of enabling a data processor to perform a cryptographic algorithm in software, the method comprising: generating an implementation of the cryptographic algorithm, the implementation being arranged such that execution of the implementation by a processor causes the processor to carry out a method according to any one of the preceding claims; and configuring the data processor to execute the implementation of the cryptographic algorithm.

In a third aspect of the invention, there is provided a system arranged to carry out a method according to either of the first or second aspects.

In a fourth aspect of the invention, there is provided a computer program which, when executed by a processor, causes the processor to carry out a method according to either of the first or second aspects.

In a fifth aspect of the invention, there is provided a computer readable medium storing a computer program according to the fourth aspect.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

(1) System Overview

Figure 5:
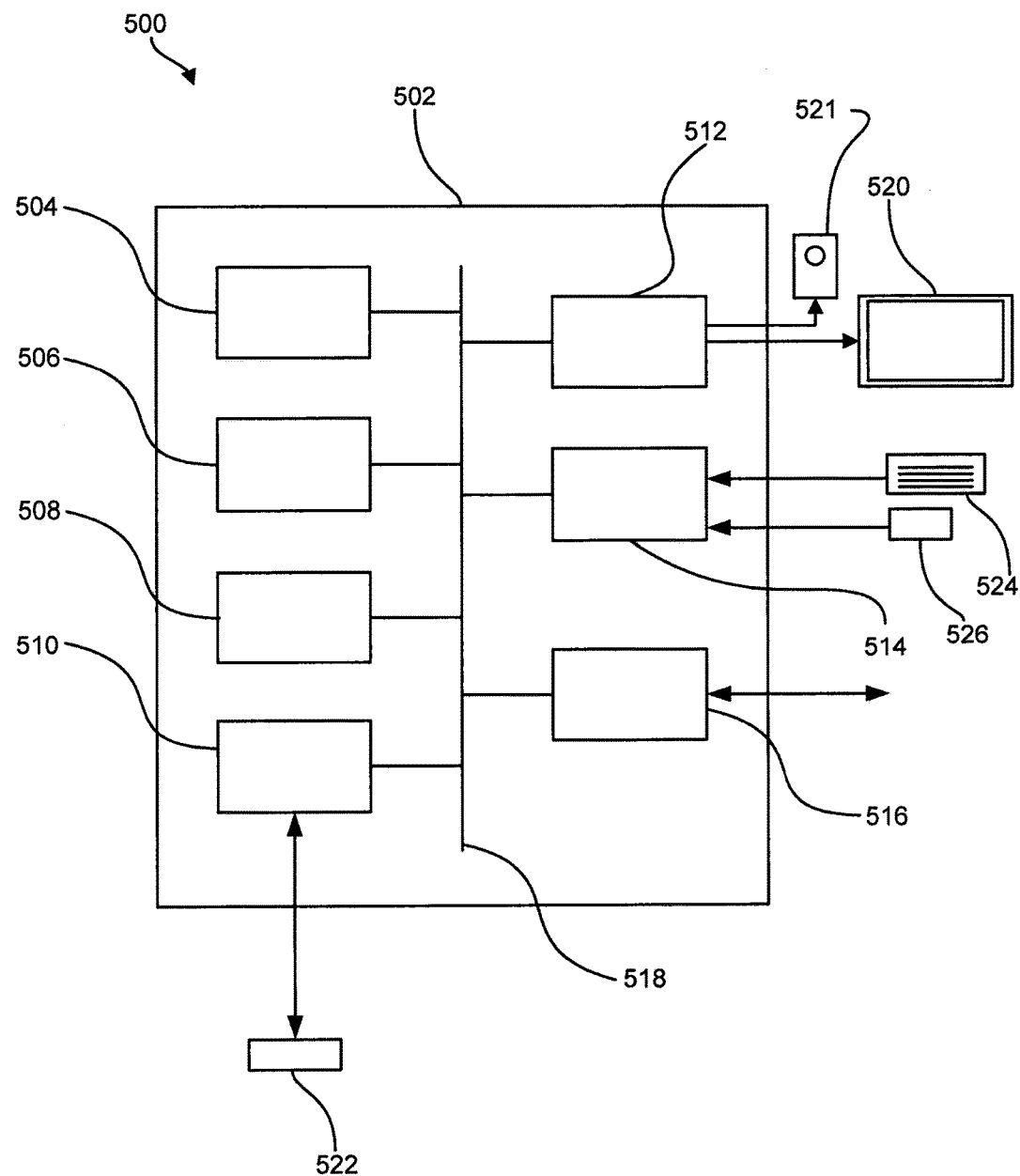
FIG. 5 schematically illustrates an exemplary computer system upon which the present invention may run.

FIG. 5 schematically illustrates an exemplary computer system 500, which may be used to execute software, software components, computer programs or program modules, such as the implementations of functions according to the present invention described further below. The computer system 500 comprises a computer 502. The computer 502 comprises: a storage medium 504, a memory 506, a processor 508, an interface 510, a user output interface 512, a user input interface 514 and a network interface 516, which are all linked together over one or more communication buses 518.

The storage medium 504 may be any form of non-volatile data storage device such as one or more of a hard disk drive, a magnetic disc, an optical disc, a ROM, etc. The storage medium 504 may store an operating system for the processor 508 to execute in order for the computer 502 to function. The storage medium 504 may also store one or more computer programs (or software or instructions or code).

The memory 506 may be any random access memory (storage unit or volatile storage medium) suitable for storing data and/or computer programs (or software or instructions or code).

The processor 508 may be any data processing unit suitable for executing one or more computer programs (such as those stored on the storage medium 504 and/or in the memory 506), some of which may be computer programs according to embodiments of the invention or computer programs that, when executed by the processor 508, cause the processor 508 to carry out a method according to an embodiment of the invention and configure the system 500 to be a system according to an embodiment of the invention. The processor 508 may comprise a single data processing unit or multiple data processing units operating in parallel or in cooperation with each other. The processor 508, in carrying out data processing operations for embodiments of the invention, may store data to and/or read data from the storage medium 504 and/or the memory 506.

The interface 510 may be any unit for providing an interface to a device 522 external to, or removable from, the computer 502. The device 522 may be a data storage device, for example, one or more of an optical disc, a magnetic disc, a solid-state-storage device, etc. The device 522 may have processing capabilities—for example, the device may be a smart card. The interface 510 may therefore access data from, or provide data to, or interface with, the device 522 in accordance with one or more commands that it receives from the processor 508.

The user input interface 514 is arranged to receive input from a user, or operator, of the system 500. The user may provide this input via one or more input devices of the system 500, such as a mouse (or other pointing device) 526 and/or a keyboard 524, that are connected to, or in communication with, the user input interface 514. However, it will be appreciated that the user may provide input to the computer 502 via one or more additional or alternative input devices (such as a touch screen). The computer 502 may store the input received from the input devices via the user input interface 514 in the memory 506 for the processor 508 to subsequently access and process, or may pass it straight to the processor 508, so that the processor 508 can respond to the user input accordingly.

The user output interface 512 is arranged to provide a graphical/visual and/or audio output to a user, or operator, of the system 500. As such, the processor 508 may be arranged to instruct the user output interface 512 to form an image/video signal representing a desired graphical output, and to provide this signal to a monitor (or screen or display unit) 520 of the system 500 that is connected to the user output interface 512. Additionally or alternatively, the processor 508 may be arranged to instruct the user output interface 512 to form an audio signal representing a desired audio output, and to provide this signal to one or more speakers 521 of the system 500 that is connected to the user output interface 512.

Finally, the network interface 516 provides functionality for the computer 502 to download data from and/or upload data to one or more data communication networks.

It will be appreciated that the architecture of the system 500 illustrated in FIG. 5 and described above is merely exemplary and that other computer systems 500 with different architectures (for example with fewer components than shown in FIG. 5 or with additional and/or alternative components than shown in FIG. 5) may be used. As examples, the computer system 500 could comprise one or more of: a personal computer; a server computer; a mobile telephone; a tablet; a laptop; a television set; a set top box;

a games console; a personal computer; a server computer; other mobile devices or consumer electronics devices; a smart card; etc.

(2) Implementing an Algorithm in Accordance with Embodiments of the Invention

Embodiments of the invention relate to the provision, implementation, and performance, of a cryptographic algorithm. The algorithm may be, for example, the whole or a part of: an encryption or decryption algorithm; an algorithm to digitally sign data; an algorithm to a generate message authentication code; an algorithm to authenticate or verify the origin or integrity of data, etc. The algorithm will make use of secret or sensitive data (such as one or more cryptographic keys)—it is desired to prevent an attacker from being able to access or deduce this secret or sensitive data, particularly when the algorithm is executed in software in a white-box environment.

Figure 1:
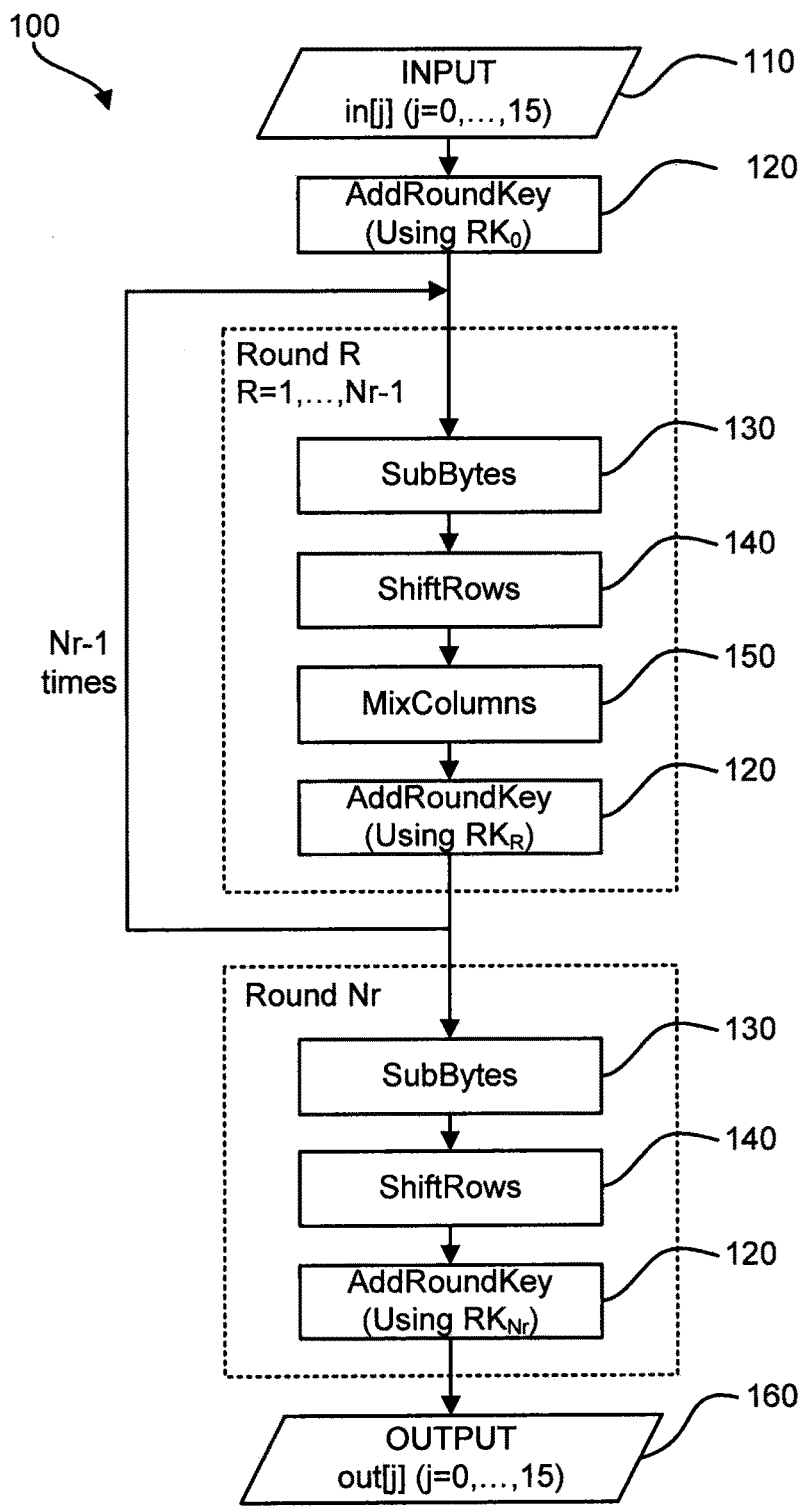
FIG. 1 provides an overview of encryption using the AES algorithm.

The cryptographic algorithm comprises one or more processing steps. For example, in the AES encryption 100 illustrated in FIG. 1, the one or more processing steps of the algorithm may each comprise one or more of the Nr rounds of the AES encryption 100. With an alternative view-point, the one or more processing steps of the algorithm may each be a respective one of the AddRoundKey function 120, the SubBytes function 130, the ShiftRows function 140 and the MixColumns function 150. Similarly, with an alternative view-point, the AddRoundKey function 120, the SubBytes function 130, the ShiftRows function 140 and the MixColumns function 150 may be implemented using their own respective processing steps, which may then be viewed as the one or more processing steps of the cryptographic algorithm. Mixtures of different view-points are, of course, possible, as are other view-points regarding what is a "processing step". Hence, the nature of a processing step depends on the granularity or resolution at which one views the operation of the algorithm. However, in general, each processing step is arranged to process (based on, or according to, respective functionality, code, etc.) a respective input to the processing step so as to generate an output corresponding to the input—the input may be the whole or part of the input to the algorithm or may be the whole or part of an intermediate result of the algorithm; the output may be the whole or part of the output of the algorithm or may be the whole or part of an intermediate result of the algorithm.

Embodiments of the invention operate by providing or implementing at least one of the one or more processing steps in a particular manner, as shall be described in more detail below with reference to FIG. 6, and also using those implementations as part of the execution of, or the processing of, the cryptographic algorithm.

Figure 3:
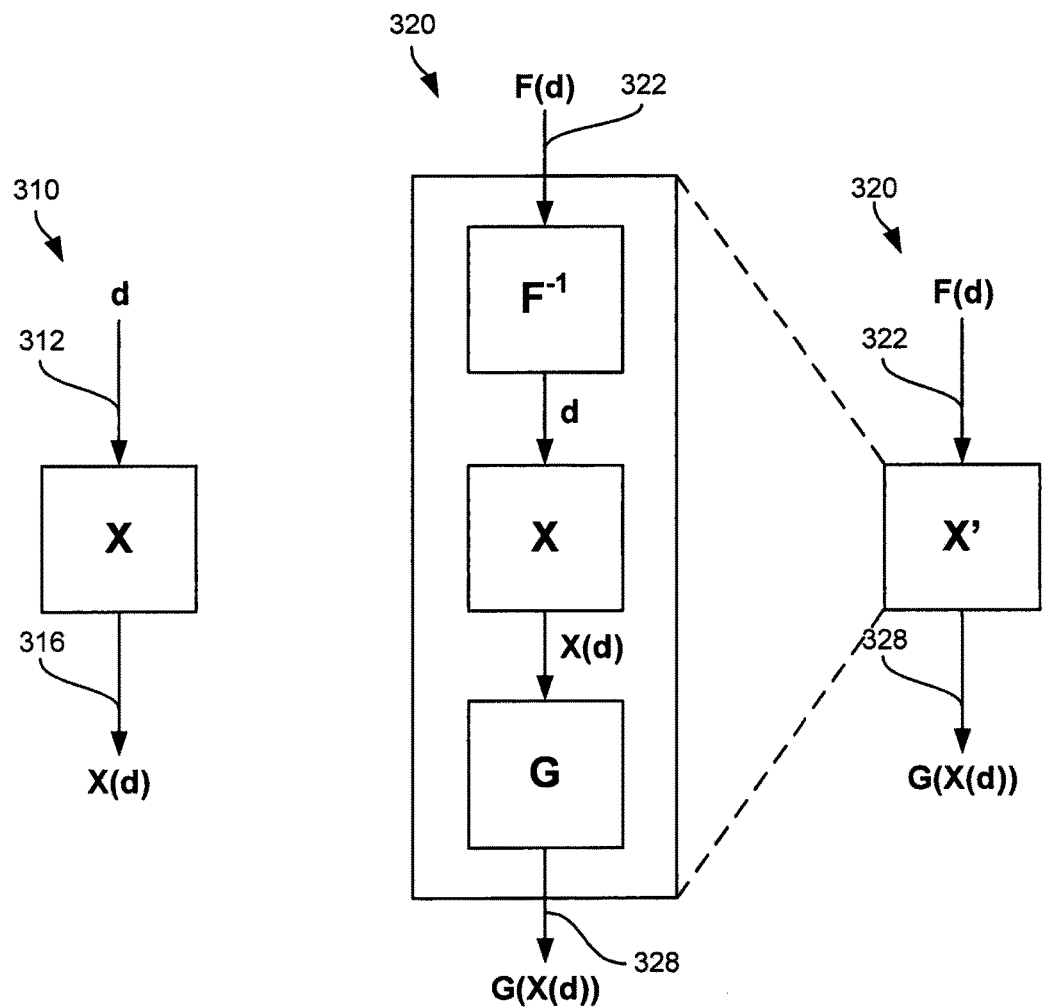
FIG. 3 schematically illustrates an implementation of an exemplary function X and an obfuscated function X'.
Figure 4:
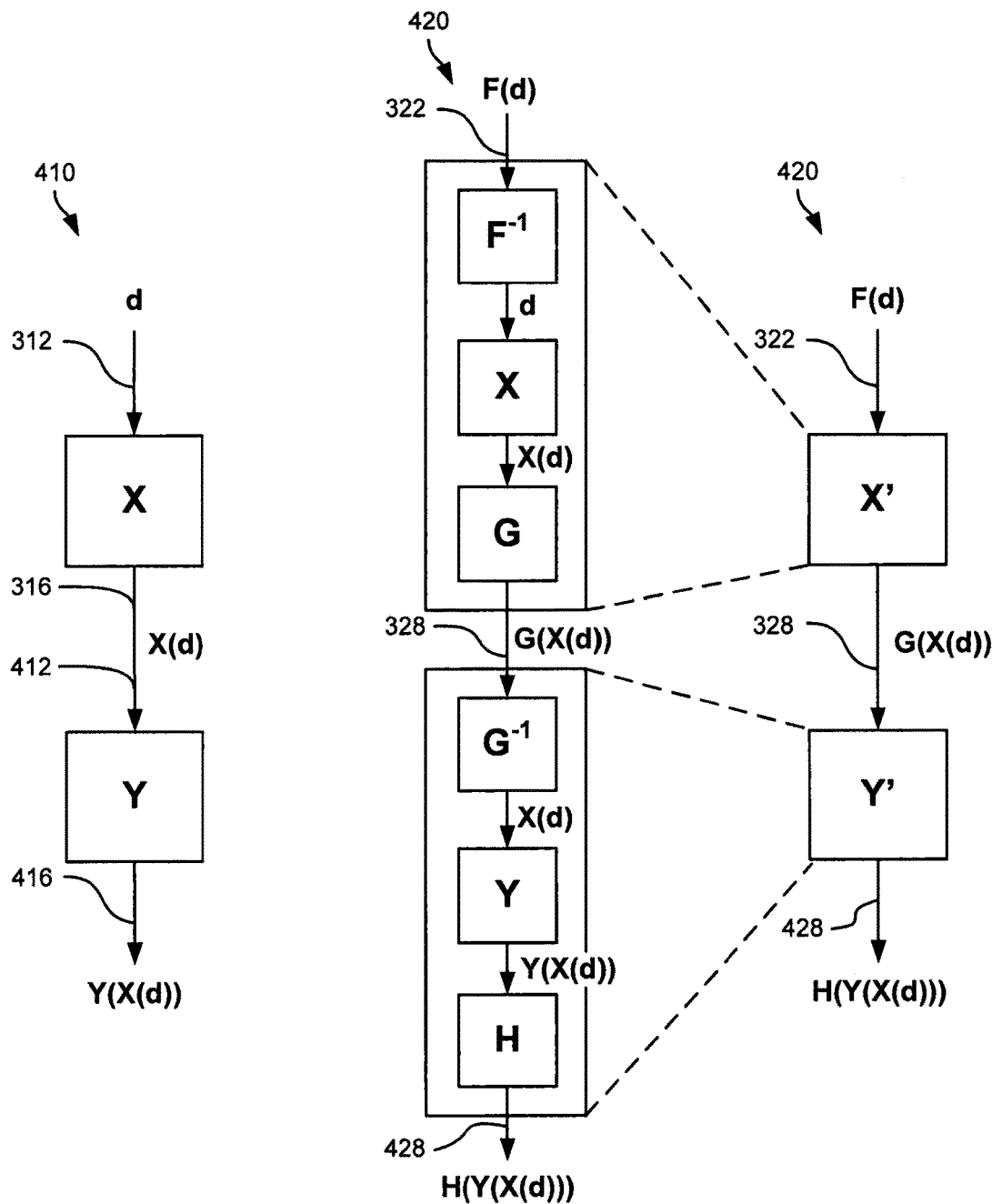
FIG. 4 schematically illustrates an obfuscated implementation of the sequence of functions X and Y comprising obfuscated functions X' and Y'
Figure 6:
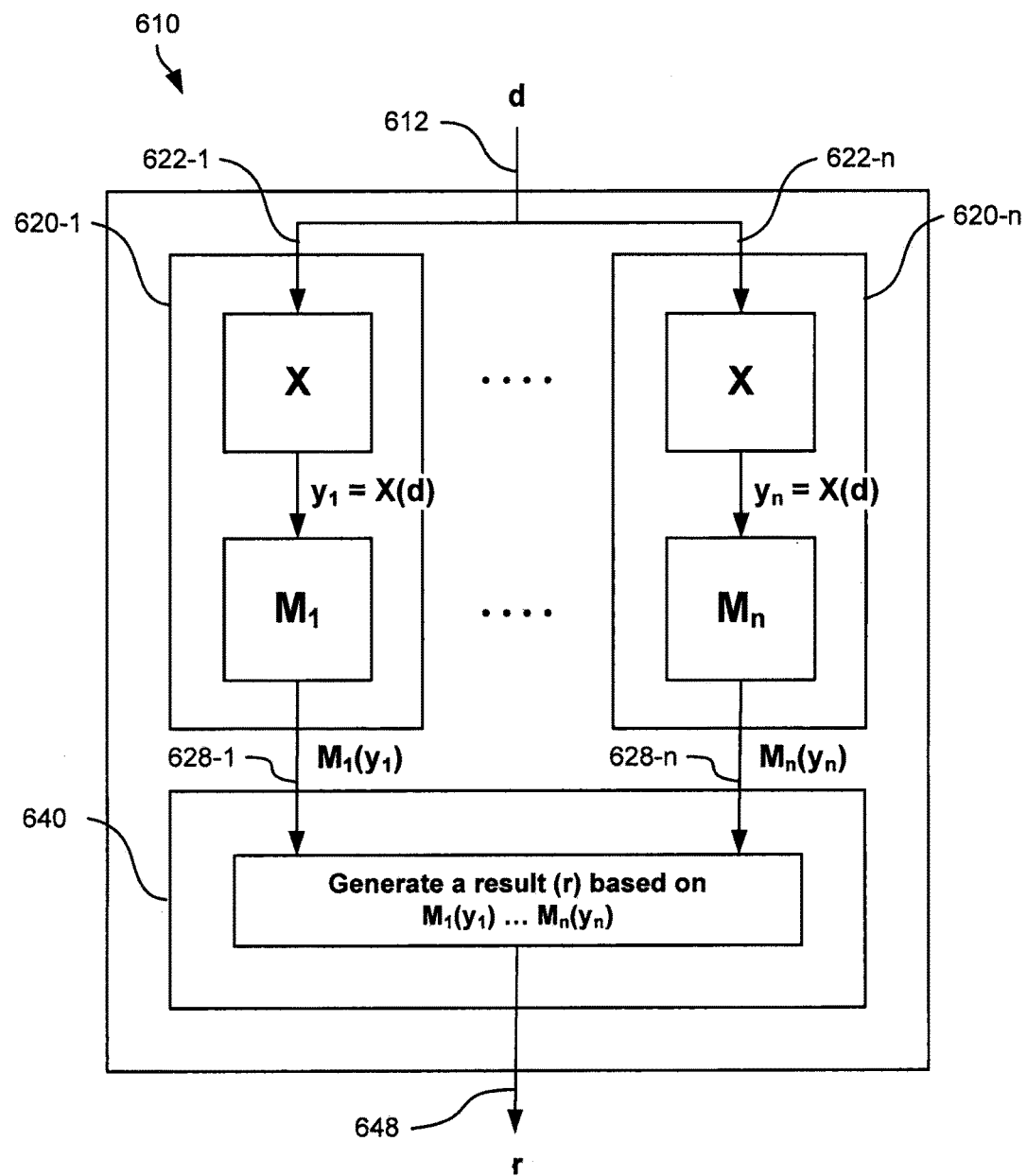
FIG. 6 schematically illustrates an implementation of the function X in accordance with an embodiment of the present invention.

FIG. 6 schematically illustrates an implementation 610 of the function, or processing step, X of FIG. 3 according to an embodiment of the invention. The function X is one of the processing steps of the above-mentioned cryptographic algorithm. As described above with reference to FIG. 3, the function X is arranged to provide, or generate, processed data X(d) as an output in response to receiving data d as an input.

The implementation 610 comprises an input 612, a plurality (n>1) of implementations 620-1, . . . , 620-n of the function X, a result generation module 640 and an output 648.

The input 612 is configured to receive (or obtain) data d and to provide (or make available) the received data d to a respective input 622-i of each implementation 620-i (i=1, . . . , n) of the function X, so that each of the plurality of implementations 620-1, . . . , 620-n of the function X can receive (or obtain) and process the data d.

Each implementation 620-i (i=1, . . . , n) of the function X is arranged to process the data d that is received at its respective input 622-i so as to produce a respective representation $M_i(y_i)$ of an intermediate result $y_i$. Here, the intermediate result $y_I$ should (in the absence of errors or tampering by an attacker) equal X(d), i.e. the result of processing the data d using the function X. The implementation 620-i (i=1, . . . , n) of the function X outputs (or provides or makes available) the generated representation $M_1(y_1)$ at a respective output 628-i of the implementation 620-i. Each implementation 620-i (1=1, . . . , n) of the function X may, therefore, be viewed as producing a respective intermediate result $y_i$ (which should be equal to X(d)) encoded (or represented) using the respective function $M_i$ as the value (or representation) $M_i(y_i)$.

Each implementation 620-i (i=1, . . . , n) of the function X is formed by combining the function X with a respective predetermined output encoding (or function or representation) $M_i$. The implementation 620-i of the function X will therefore generate a representation $M_i(X(d))$ of the processed data X(d) that would normally result from processing the data d using the function X. Thus, the implementation 620-i (i=1, . . . , n) of the function X may be implemented by implementing the function $M_i \circ X$ (i.e. the function X combined with its respective output encoding $M_i$). This may be achieved, for example, by implementing the function $M_i \circ X$ as a corresponding lookup table. Alternatively, the implementation 620-i (1=1, . . . n) of the function X may be implemented by carrying out the whole or a part of the function X on the input data d as one or more initial steps, followed by carrying out the function $M_1$ (potentially in combination with any remaining parts of the function X) as one or more subsequent steps—in such embodiments, two different implementations 620-i and 620-j (i≠j) may implement the function X differently.

It will be appreciated that one or more of the implementations 620-i (i=1, . . . , n) of the function X may not actually explicitly calculate their respective intermediate result $y_i$. For example, if the implementation 620-i of the function X implements $M_i \circ X$ as a single lookup table, then the value of $y_i$ is not explicitly calculated and stored in memory—instead, the representation $M_i(y_i)$ is what is actually produced directly.

The software for the implementation 610 therefore has n different parts (or components or modules) that will each be computing a respective representation $M_i(y_i)$ (using a respective representation $M_i$) of their intermediate result $y_i$. These parts may be distributed throughout the binary executable of the software, so that it is difficult for an attacker to identify those parts.

The functions $M_i$ (i=1, . . . , n) may be any suitable functions for generating a representation of an intermediate value. However, the functions $M_i$ (i=1, . . . , n) are preferably bijections (so that the value $y_i$ may be obtained from $M_i(y_i)$ in the knowledge of $M_i$), mapping from the range R of possible output values of the function X onto a correspondingly-sized range of other values (this range preferably also being the range R).

The functions $M_1$ (i=1, . . . , n) may be different from each other, i.e. the output encoding IA of a particular implementation 620-i of the function X may be different from the output encoding $M_j$ of any of the other implementations 620-j (j=1, . . . , n; j≠i) of the function X.

Alternatively, two or more of the implementations 620-i may have the same output encoding $M_i$.

For one or more of the implementations 620-i of the function X, the corresponding output encoding $M_i$ may be a trivial output encoding, so that $M_i(z)=z$ for all $z$, in which case the representation of the intermediate result $y_i$ that is obtained from that implementation 620-i via the output 628-i of that implementation 620-i is the value $y_i$. Such an implementation 620-i of the function X may be indistinguishable from an implementation 620-j of the function X for which the output encoding $M_j$ is not the trivial output encoding—this happens if, for example, the implementations $M_i$ and $M_j$ are each implemented using respective lookup tables, in which case an attacker cannot know which table corresponds to using the trivial encoding.

The implementation 610 is configured so that the output $M_i(y_i)$ from each implementation 620-i (i=1, ..., n) of the function X is provided to the result generation module 640. Thus, the result generation module 640 receives, or obtains, from each implementation 620-i (i=1, ..., n) of the function X a respective representation $M_i(y_i)$ of an intermediate result $y_i$ of that implementation 620-i. As mentioned, in the absence of errors or tampering by an attacker, $y_i=X(d)$ for i=1, ..., n.

The result generation module 640 is configured use the representations $M_i(y_i)$ (i=1, ..., n) to generate a result r. The result r is based on each of the intermediate results $y_i$ (1=1, ..., n). In particular, if each intermediate result $y_i$ actually assumes the expected value $X(d)$ (i.e. the output that would occur if the function X processed the input data d), which should normally happen, so that the values received by the result generation module 640 are the expected representations $M_i(X(d))$ (i=1, ..., n), then the result r equals $X(d)$ (i.e. the output that would occur from the function X when the function X processes input data d). This shall be described in more detail shortly.

The result generation module 640 is configured to output, or provide, the result r via the output 648.

"Normal processing conditions" may be considered to be those in which the processing of the software takes place without any tampering (or other processing errors) occurring. The "normal result" of the function X for the data d may be considered to be the processed data $X(d)$ that would result from the processing of the data d by the function X under normal processing conditions.

Under normal processing conditions, the representation $M_i(y_i)$ of the intermediate result $y_i$ provided by the implementation 620-i (i=1, ..., n) of the function X will correspond to the normal result $X(d)$ of the function X encoded using encoding $M_i$, i.e. $M_i(X(d))$. That is to say the intermediate results $y_i$ themselves will correspond to the normal result $X(d)$ of the function X. Thus, under normal processing conditions, the result r of the result generation module 640 is the value $X(d)$.

However, as discussed above, if the implementation 610 is executed in a white-box processing environment, an attacker may try to modify the processing flow and/or data values used by the implementation 610. This may be performed, for example, to try to ascertain or deduce particular information from the implementation 610 (such as a cryptographic key implemented or used in the function X). An example of such an attack is a so-called fault-injection attack, as is known to the person skilled in this field of technology. In particular, with the implementation 310 of the function X, an attacker may modify one or more intermediate results of the function X so as to produce a modified output of the function X, which the attacker may observe. By carrying out numerous such modifications, the attacker generates a large number of modification-observation pairs, which the attacker may then use to try to deduce the desired information from the function X (such as the cryptographic key being used).

When using the implementation 610 of the function X, an attacker may tamper with the processing of one or more of the implementations 620-$i_1$, ..., 620-$i_w$ ($1 \leq i_1, ..., i_w \leq n$) of the function X as set out above (for some integer w, $1 \leq w \leq n$) such that the intermediate results $y_{i_1}, ..., y_{i_w}$ that are obtained from those "tampered" implementations 620-$i_1$, ..., 620-$i_w$ are no longer the normal (or expected) result of the function X, i.e. $y_{i_1}, ..., y_{i_w} \neq X(d)$. These incorrect intermediate results do not correspond to the normal result for the function X and do not correspond with any normal intermediate results that may be obtained from the processing by the implementations 620-i of the function X that have not been tampered with. Furthermore, the intermediate results $y_{i_1}, ..., y_{i_w}$ are unlikely to correspond with each other, even if the processing of all of the implementations 620-i of the function X is tampered with, as the only way in which that could occur would be if the same tampering is applied to the processing of each implementation 620-i of the function X—this would involve a significantly increased effort by the attacker, as he would need knowledge of each fragment of code in the software that corresponds to each of the implementations 620-i (i=1, ..., n) of the function X. This is especially true if different implementations 620-i (i=1, ..., n) of the function X actually carry out or perform the function X in different ways. Even in the trivial case whereby two implementations 620-i and 620-j of function X use the same output encoding (i.e. $M_i=M_j$), the attacker can only make the intermediate results $y_i$ and $y_j$ correspond to each other if he tampers with the processing of each of the implementations 620-i and 620-j of the function X in exactly the same way. Clearly this would require the attacker to understand the software in more detail and would not be possible for the attacker to achieve by more simplistic or randomised tampering methods. However, in the less trivial case, where implementations 620-i (i=1, ..., n) use different respective output encodings $M_i$ combined with the function X, it is even more difficult for an attacker to know how to tamper with the software in a manner in which the intermediate results $y_i$ that are represented at the output of the implementations 620-i of the function X will still correspond to each other.

In summary, the plurality of implementations 620-i (i=1, ..., n) of the function X produce respective representations $M_i(y_i)$ of respective intermediate results $y_i$. Under normal processing conditions, $y_i=X(d)$ (i=1, ..., n), i.e. the intermediate results are the same as the normal result that is produced by the function X. In contrast, when an attacker modifies the processing of, or data used by, one or more of the implementations 620-i, the plurality of implementations 620-i (i=1, ..., n) of the function X will still produce respective representations $M_i(y_i)$ of respective intermediate results $y_i$, but it is likely that these intermediate results $y_i$ will not all be the same as each other (due to the extreme difficulty for an attacker to identify and manipulate the processing of each implementation 620-i of the function X so that the intermediate results $y_i$ are the same as each other).

The result generation module 640 will now be described in more detail. In general, the result generation module 640 uses the representations $M_i(y_i)$ (i=1, ..., n) that it receives to generate a result r based on all of the intermediate results $y_i$ (i=1, ..., n), and provides the result r to, or via, the output 648 of the implementation 610. The general operation of the result generation module 640 is to ensure that the result r that is generated will correspond to the normal result $X(d)$ for the function X if the processing conditions are normal. Thus, if the intermediate results $y_i$ (i=1, . . . , n) are all equal to X(d), then the result r will be equal to X(d).

Preferably, if an attacker modifies the processing of, or data used by, one or more of the implementations 620-i, so that one or more of the intermediate results $y_i$ (i=1, . . . , n) differs from the other intermediate results $y_i$ (i=1, . . . , n), then the result generation module 640 may be arranged to perform a corresponding action.

Preferably, if an attacker modified the processing of, or data used by, one of the implementations 620-i so that the intermediate result $y_i$ does not equal X(d), then the result generation module 640 may be arranged so that the result r does not equal $y_i$ (i.e. the attacker will be provided with a result r that does not correspond to his attack on the function X)—this helps thwart the attacker's attempt to carry out fault-injection attacks.

There are many different ways in which this general functionality of the result generation module 640 to form the result r may be implemented, some examples of which will now be discussed.

In some embodiments, the result generation module 640 implements a function h that has the property that $h(z_1, \ldots, z_n)=z_1$ if all of the inputs $z_i$ are the same, and (preferably) $h(z_1, \ldots, z_n) \neq z_i$ (or at least is unlikely to equal $z_i$) for any i=1, . . . , n if some of the inputs $z_i$ differ from each other. In this case, the result r may be $r=h(y_1, \ldots, y_n)$.

In some embodiments, the function h may form the result r by combining all the intermediate results $y_i$ together to form the result r, such that different parts of the result r come from corresponding parts of a respective one of the intermediate results $y_i$. For example, if the result r is a 128-bit value, and there are n=4 intermediate results $y_i$, then bits 1-32 of r may be set to be bits 1-32 of $y_1$, bits 33-64 of r may be set to be bits 33-64 of $y_2$, bits 65-96 of r may be set to be bits 65-96 of $y_3$, and bits 97-128 of r may be set to be bits 97-128 of $y_4$ (although it will be appreciated that different partitions of the result r, which may be interleaved and which may have different sizes, could be used). Under normal processing conditions, all of the intermediate results $y_i$ will correspond to the normal result for the function X, such that the result r that would be produced by this method will be the normal result for the function X. If some of the intermediate results $y_i$ differ from each other, then the result r is unlikely to correspond to any one of the intermediate results $y_i$.

In some embodiments, the function h forms the result r by XOR-ing all of the intermediate results $y_i$ together to form the result r. If n is odd, then the result r will equal $y_1, \ldots, y_n$ if all of the intermediate results are the same as each other. If some of the intermediate results $y_i$ differ from each other, then the result r is unlikely to correspond to any one of the intermediate results $y_i$.

In some embodiments, the function h forms the result r so that, if the intermediate results $y_1, \ldots, y_n$ do not all assume the same value then it is infeasible to determine the output X(d) that corresponds to the input d for the processing step from the result r. This may be achieved using any of the techniques described herein.

In some embodiments, the result r is formed using a multivariate polynomial in the parameters $y_1, \ldots, y_n$ (which could involve one or more coefficients randomly generated by the result generation module 640), where this polynomial has the properties of the function h as set out above. For example, if n=2, then one could set $r=R(y_1-y_2)+y_1$, where the coefficient R may be a constant or may be a value randomly generated by the result generation module 640.

In some embodiments, the result generation module 640 may perform a determination as to whether tampering has taken place based on whether the intermediate results $y_i$ correspond with each other. This could be performed by comparing the values $y_1, \ldots, y_n$ or comparing the representations $M_1(y_2), \ldots, M_n(y_n)$. If the values $y_1, \ldots, y_n$ are all the same (or if the representations $M_1(y_1), \ldots, M_n(y_n)$ all represent the same value), then it is determined that tampering has not taken place; otherwise, it is determined that tampering has taken place, in which case the result generation module 640 may take a predetermined action.

In some embodiments, if it is determined that no tampering has taken place, then the result generation module 640 may set the result r to be any one of the intermediate results $y_1, \ldots, y_n$.

In some embodiments, if it is determined that tampering has occurred, then the result generation module 640 may generate an arbitrary result r, such as generating the result r to be (or based on) a random or pseudo-random number or, setting all bits of the result r to be 0 or 1, or setting the value of r to be some other predetermined value. In this way, the result r is unrelated to the processing performed by the implementations 620-i (i=1, . . . , n) of the function X, and hence the result r is meaningless to the attacker.

In some embodiments, if it is determined that tampering has occurred, then the result generation module 640 may be implemented to return a result r that may correspond to the normal result for the function X. As an example, the result generation module 640 may implement a voting mechanism whereby when there are multiple different values assumed by the intermediate results $y_1, \ldots, y_n$ that have been produced (some of which may be equal to X(d)), the result generation module 640 may determine which value of the intermediate results $y_1, \ldots, y_n$ is most common and set the result r to be that value (i.e. r is set to be the mode of the intermediate results $y_i, \ldots, y_n$). Thus, if the attacker has only been able to modify a small number of the implementations 620-i (i=1, . . . , n) of the function X, then the result r will still equal the normal result X(d). Similarly, the result generation module 640 may be implemented so as to provide a measure of error correction by forming the result r from the multiple values of the intermediate results $y_1, \ldots, y_n$—for example, the $k^{th}$ bit of the result r may be set to be the most frequent value for the $k^{th}$ bits of the intermediate results $y_1, \ldots, y_n$.

Thus, in some embodiments, the result r is formed as an average (e.g. a mode, mean or median) of the intermediate results $y_1, \ldots, y_n$.

In some embodiments, if the result generation module 640 determines that tampering has occurred, the result generation module 640 may provide an indication that tampering has taken place. The indication may be used, for example, to log the tampering attempt—the provider of the implementation 610 may be informed of this attempt (e.g. if they have access to the log).

In some embodiments, if the result generation module 640 determines that tampering has occurred, the result generation module 640 may terminate execution of the algorithm (i.e. cease the execution of the software of which the implementation 610 form a part thereof), in which case a result r may not actually be output (or the result r may be viewed as an instruction to cease execution of the algorithm).

It will be appreciated that the result generation module 640 may implement one or more of the above-mentioned examples of functionality for the result generation module 640. It will also be appreciated that the result generation module 640 may carry out any other processing to make it more difficult for an attacker to use the output of the implementation 610 as part of a fault-injection attack (or any other kind of attack).

Preferably, the result generation module 640 is implemented in an obfuscated manner (as described above) which ensures that the encodings $M_i$ (1=1, . . . , n) that are used for the representations $M_i(y_i)$ of the intermediate results $y_i$ are hidden from an attacker. This may be achieved by forming the result generation module 640 as a single lookup table or network of lookup tables which combine the functionality of the comparison block or the function h with the encodings $M_i$. Where the result generation module 640 (or the implementations of the function X) is implemented as a single lookup table, it may be considered that the active functionality, such as the step of determining whether tampering has occurred, does not take place since the result is determined merely by looking up a result in the lookup table. Nonetheless, it will be appreciated that it is possible to implement such active functionality using a lookup table as described above.

It is possible that an attacker may attempt to tamper with the processing of the result generation module 640, however it will be appreciated that since the result generation module 640 does not implement the function X, the attacker is not able to derive any useful information about the function X (such as any cryptographic keys that might be embodied in a key-dependent implementation of the function X) by doing so.

As set out above, the function X may comprise a plurality of its own processing steps, with each processing step passing a value to a subsequent processing step. By implementing the function X as an implementation 610, it is significantly more difficult for an attacker to carry out an attack based on those values, as the attacker would need to be able to modify those values in each of the implementations 620-i of the function X.

Figure 7:
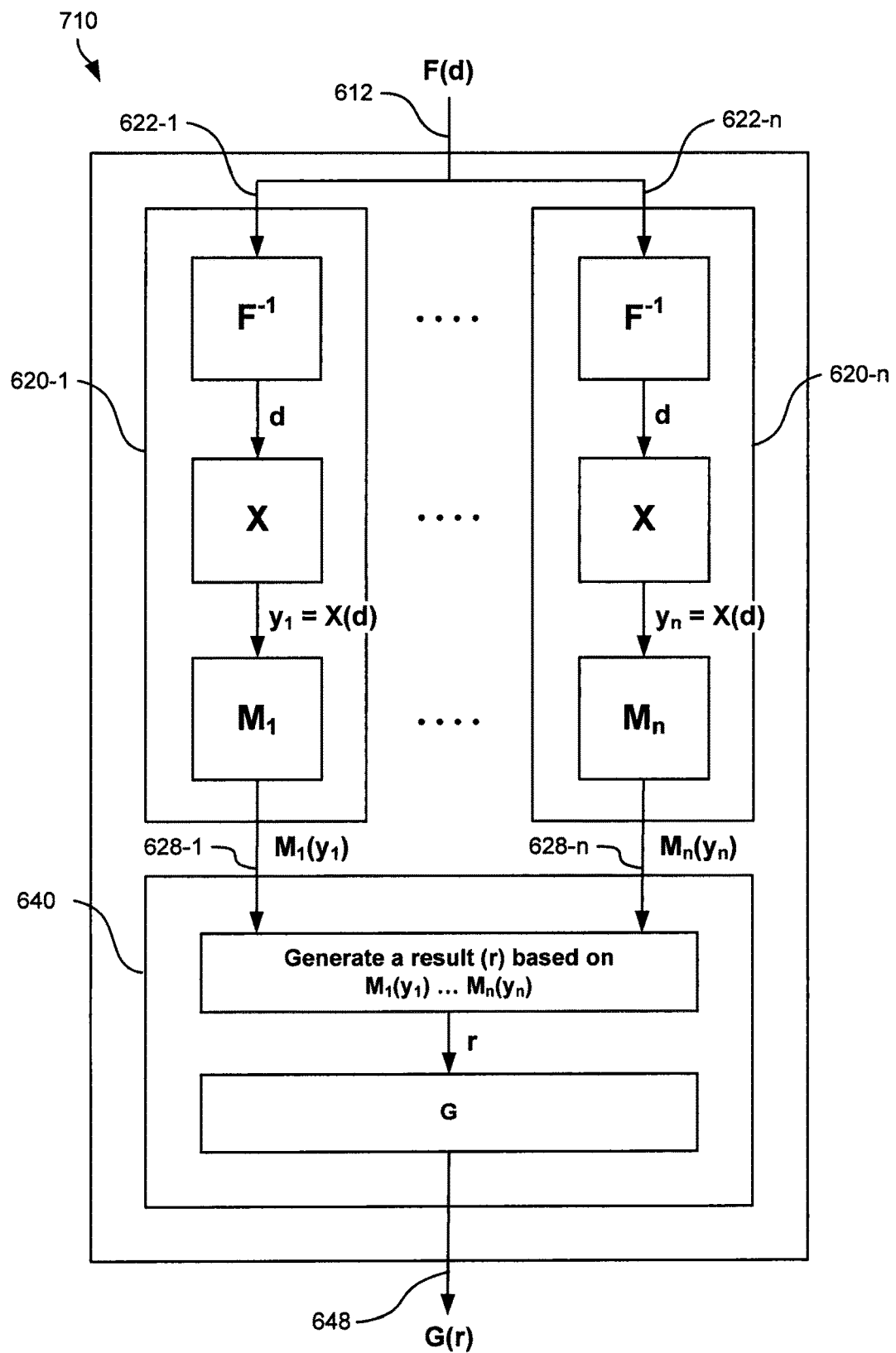
FIG. 7 schematically illustrates an obfuscated implementation of the function X in accordance with another embodiment of the present invention.

In some embodiments of the invention, the implementation 610 is implemented using obfuscation techniques, as illustrated in FIG. 7. In particular, FIG. 7 schematically illustrates an obfuscated version 710 of the implementation 610 of FIG. 6. In particular, the version 710 uses an input encoding F and/or an output encoding G, in the manner described with reference to FIG. 3.

Figure 2:
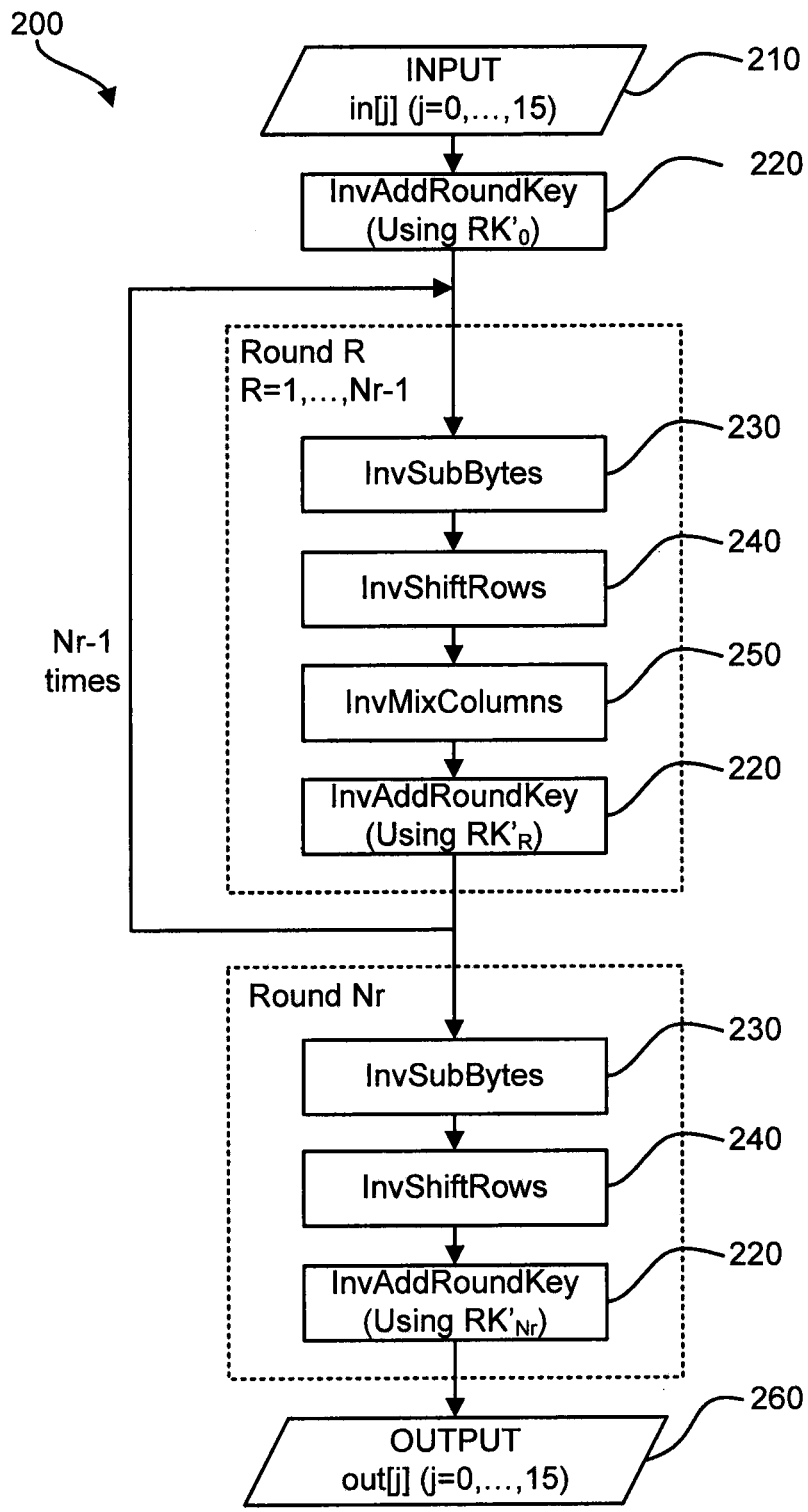
FIG. 2 provides an overview of decryption 200 using the AES algorithm.

In one embodiment, the algorithm being implemented is encryption 100 or decryption 200 of the AES. As described above with reference to FIGS. 1 and 2, encryption 100 or decryption 200 according to the AES comprises a number of rounds of processing, whereby each round includes a number of functions such as the SubBytes function 130, the ShiftRows function 140, the MixColumns function 150, the AddRoundKey function 120, the InvSubBytes function 230, the InvShiftRows function 240, the InvMixColumns function 250 and the InvAddRoundKey function 220. As also discussed above, the functions of the AES algorithm may be implemented as lookup tables and obfuscated using input and output encodings. A key-dependent implementation of the AES algorithm may be created by further combining the AES round keys with the appropriate functions by partial evaluation. Embodiments of the invention may be used to implement, and carry out processing for, the encryption 100 or decryption 200 of the AES. For example, the function X may be taken to be one or more rounds of the encryption 100 or decryption 200, such that those functions making up those rounds of the encryption 100 or decryption 200 are implemented, and performed, using an implementation 610, 710 for the function X. In such embodiments, the function X preferably comprises one or more of the final rounds (such as the last 3 rounds) of the encryption 100 or decryption 200. The same applies analogously to other round-based cryptographic algorithms, such as DES or triple DES (which are well-known to the skilled person).

Figure 8:
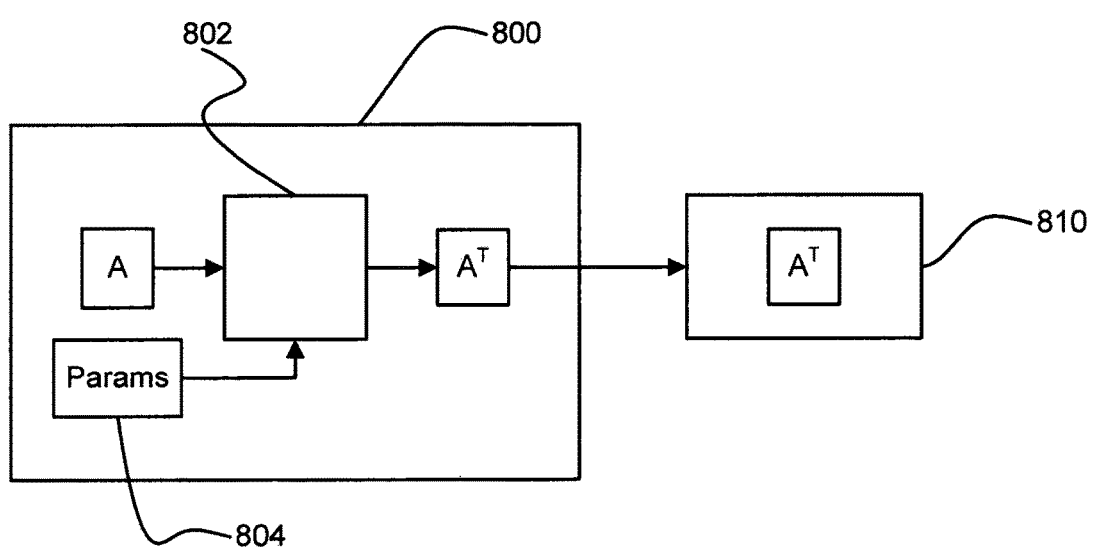
FIG. 8 schematically illustrates a system according to another embodiment of the present invention.

FIG. 8 schematically illustrates a system according to an embodiment of the invention.

A provider 800 is arranged to take an initial algorithm (or operation or function or process) A and, using a generation program 802, generate a corresponding version $A^T$ of the initial algorithm A. The algorithm comprises one or more processing steps as set out above, and at least one of these processing steps is implemented in the version $A^T$ using an implementation 610, 710 for that processing step, as described above with reference to FIGS. 6 and 7. The generation program 802 may make use of one or more parameters 804 to form the version $A^T$. These parameters 804 may, for example, parameters that define one or more of the encodings $M_i$ that are used in the implementation 610, 710. The provider 800 provides the version $A^T$ to a client 810, so that the client 810 can execute, use or implement the version $A^T$. The version $A^T$ may be provided to the client 810 as software and/or hardware.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of secured execution of a cryptographic algorithm by at least one computer processor, the cryptographic algorithm comprising one or more processing steps, wherein each processing step is arranged to process a respective input to the processing step so as to generate an output corresponding to the input, characterized in that, for at least a particular processing step of the one or more processing steps, the method comprises:
providing an input for the particular processing step as an input to a plurality of implementations of the particular processing step, wherein each implementation of the particular processing step is arranged to output a corresponding intermediate result represented using a respective predetermined output representation; and
using the predetermined output representation of the intermediate results to generate a corresponding result for the particular processing step that is based on each of the intermediate results, wherein, if each intermediate result is the output that corresponds to the input for the particular processing step then the result for the particular processing step is the output that corresponds to the input for the particular processing step, wherein a difference between two or more intermediate results is indicative of potential tampering with the secured execution of the cryptographic algorithm.

2. The method of claim 1, wherein each implementation uses a respective predetermined output representation that is different from the respective predetermined output representation used by the other implementations.

3. The method of any claim 1, wherein for at least one of the implementations, the respective predetermined representation represents the intermediate result as the intermediate result.

4. The method of claim 1, wherein each predetermined representation is a bijective mapping.

5. The method of claim 1, wherein the result is generated as a function of the intermediate results such that if all of the intermediate results assume the same value then the result assumes that value.

6. The method of claim 1, wherein the result is generated as a function of the intermediate results such that if the intermediate results do not all assume the same value then the result assumes a random value or a predetermined value.

7. The method of claim 1, wherein the result is generated as a function of the intermediate results such that if the intermediate results do not all assume the same value then it is infeasible to determine, from the result, the output that corresponds to the input for the processing step.

8. The method of claim 1, wherein the result is generated as a function of the intermediate results such that if the intermediate results do not all assume the same value then the result is an average of the intermediate results.

9. The method of claim 8, wherein the average of the intermediate results is a mode of the intermediate results.

10. The method of claim 1, wherein using the representation of the intermediate results to generate a result for the particular processing step that is based on each of the intermediate results comprises:
determining whether all of the intermediate results assume the same value and;
if it is determined that the intermediate results do not all assume the same value, performing a predetermined action.

11. The method of claim 10, wherein the predetermined action comprises one or more of:
(a) ceasing performing the cryptographic algorithm;
(b) recording that the intermediate results do not all assume the same value.

12. The method of claim 1, wherein the input for the particular processing step is provided as an input to the plurality of implementations of the processing step encoded using a predetermined encoding.

13. The method of claim 1, wherein generating the result comprises generating the result encoded using a predetermined encoding.

14. The method of claim 1, wherein the at least one of the one or more processing steps is an operation comprising a plurality of processing steps for that operation.

15. The method of claim 1, wherein the at least one of the one or more processing steps comprises one or more rounds for the cryptographic algorithm.

16. The method of claim 1, wherein the cryptographic algorithm is either encryption or decryption according to AES or triple DES.

17. The method of claim 1 wherein the at least one of the one or more processing steps together form a final processing operation for cryptographic algorithm.

18. A method of enabling a data processor to perform secured execution of a cryptographic algorithm in software, the method comprising:
generating an implementation of the cryptographic algorithm, the implementation being arranged such that execution of the implementation by a processor causes the processor to carry out a method according to claim 1; and
configuring the data processor to execute the implementation of the cryptographic algorithm.

19. A system comprising one or more hardware processors arranged to carry out a method of performing secured execution of a cryptographic algorithm, the cryptographic algorithm comprising one or more processing steps, wherein each processing step is arranged to process a respective input to the processing step so as to generate an output corresponding to the input, characterized in that, for at least a particular processing step of the one or more processing steps, the method comprises:
providing an input for the particular processing step as an input to a plurality of implementations of the particular processing step, wherein each implementation of the particular processing step is arranged to output a corresponding intermediate result represented using a respective predetermined output representation; and
using the predetermined output representation of the intermediate results to generate a corresponding result for the particular processing step that is based on each of the intermediate results, wherein, if each intermediate result is the output that corresponds to the input for the particular processing step then the result for the particular processing step is the output that corresponds to the input for the particular processing step, wherein a difference between two or more intermediate results is indicative of potential tampering with the secured execution of the cryptographic algorithm.

20. A non-transitory computer readable medium storing a computer program which, when executed by one or more processors, causes the one or more processors to carry out a method of performing secured execution of a cryptographic algorithm, the cryptographic algorithm comprising one or more processing steps, wherein each processing step is arranged to process a respective input to the processing step so as to generate an output corresponding to the input, characterized in that, for at least a particular processing step of the one or more processing steps, the method comprises:

providing an input for the particular processing step as an input to a plurality of implementations of the particular processing step, wherein each implementation of the particular processing step is arranged to output a corresponding intermediate result represented using a respective predetermined output representation; and using the predetermined output representation of the intermediate results to generate a corresponding result for the particular processing step that is based on each of the intermediate results, wherein, if each intermediate result is the output that corresponds to the input for the particular processing step then the result for the particular processing step is the output that corresponds to the input for the particular processing step, wherein a difference between two or more intermediate results is indicative of potential tampering with the secured execution of the cryptographic algorithm.

\* \* \* \* \*